US010553979B2

(12) United States Patent
Iida

(10) Patent No.: US 10,553,979 B2
(45) Date of Patent: Feb. 4, 2020

(54) CONNECTOR

(71) Applicant: Sumitomo Wiring Systems, Ltd., Yokkaichi, Mie (JP)

(72) Inventor: Tetsuya Iida, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 15/767,470

(22) PCT Filed: Sep. 27, 2016

(86) PCT No.: PCT/JP2016/078355
§ 371 (c)(1),
(2) Date: Apr. 11, 2018

(87) PCT Pub. No.: WO2017/065001
PCT Pub. Date: Apr. 20, 2017

(65) Prior Publication Data
US 2018/0294593 A1    Oct. 11, 2018

(30) Foreign Application Priority Data
Oct. 15, 2015    (JP) ................. 2015-203629

(51) Int. Cl.
*H01R 13/502* (2006.01)
*H01R 13/56* (2006.01)
(Continued)

(52) U.S. Cl.
CPC ............ *H01R 13/502* (2013.01); *B60L 3/003* (2013.01); *H01R 13/41* (2013.01); *H01R 13/56* (2013.01);
(Continued)

(58) Field of Classification Search
CPC ...... H01R 13/405; H01R 43/24; H01R 11/12; H01R 4/34; H01R 13/501; H01R 4/185; H01R 13/4361
(Continued)

(56) References Cited

U.S. PATENT DOCUMENTS 6,932,657 B2 *   8/2005   Mizutani ........... B29C 45/14311
                                                439/736
6,966,800 B2 *   11/2005   Mott ................. B29C 45/14311
                                                439/722
(Continued)

FOREIGN PATENT DOCUMENTS

JP    2004-172071    6/2004
JP    2008-258103    10/2008
(Continued)

OTHER PUBLICATIONS

International Search Report dated Dec. 27, 2016.

*Primary Examiner* — Edwin A. Leon
*Assistant Examiner* — Matthew T Dzierzynski
(74) *Attorney, Agent, or Firm* — Gerald E. Hespos; Matthew T. Hespos; Michael J. Porco

(57) ABSTRACT

A connector (10) includes terminals (20), wires (W) connected respectively to the terminals (20) and a housing (30) integrally holding the terminals (20) and the wires (W). The housing (30) includes a terminal holding portion 33 collectively holding the terminals (20) and wire holding portions (34) individually holding the wires (W). The wire holding portions (34) are flexible, project in the same direction from the terminal holding portion (33) and are separated from each other.

8 Claims, 8 Drawing Sheets

(51) Int. Cl.
  *H01R 24/60* (2011.01)
  *H01R 13/6581* (2011.01)
  *H01R 13/207* (2006.01)
  *H01R 13/41* (2006.01)
  *B60L 3/00* (2019.01)

(52) U.S. Cl.
  CPC ......... *H01R 13/6581* (2013.01); *H01R 24/60* (2013.01); *H01R 13/207* (2013.01); *H01R 2201/26* (2013.01)

(58) Field of Classification Search
  USPC ................................. 439/736, 456, 470, 589
  See application file for complete search history.

(56) References Cited

U.S. PATENT DOCUMENTS

| | | | | |
|---|---|---|---|---|
| 7,452,247 | B1 * | 11/2008 | Rahman | B29C 45/1671 264/272.11 |
| 7,618,298 | B2 * | 11/2009 | Rahman | B29C 45/1671 264/272.11 |
| 8,118,614 | B2 * | 2/2012 | Sawada | H01R 13/5219 439/589 |
| 8,568,159 | B2 * | 10/2013 | Noda | H01R 13/5812 439/470 |
| 9,130,295 | B2 * | 9/2015 | Nguyen Nhu | H01R 13/447 |
| 9,397,440 | B2 * | 7/2016 | Mori | H01R 13/504 |
| 2004/0142597 | A1 | 7/2004 | Mizutani | |
| 2005/0191904 | A1 * | 9/2005 | Fukushima | H01R 43/24 439/607.58 |
| 2015/0132996 | A1 | 5/2015 | Yoshida et al. | |

FOREIGN PATENT DOCUMENTS

| | | |
|---|---|---|
| JP | 2011-18582 | 1/2011 |
| JP | 2015-95356 | 5/2015 |

* cited by examiner

CONNECTOR

BACKGROUND

Field of the Invention

This specification relates to a connector.

Description of the Related Art

Japanese Unexamined Patent Publication No. 2004-172071 discloses a device connector with a terminal fitting connected to an end of a wire. An exterior body made of resin is molded with at least a connected part of the terminal fitting and the wire embedded. The terminal fitting includes a device connecting portion to be connected to a device-side terminal and a wire crimping portion to be crimped to a conductor exposed by stripping an insulation coating of the wire. The exterior body includes a device fitting portion in which a base end part of the device connecting portion of the terminal fitting is embedded and a wire surrounding portion in which the wire crimping portion is embedded. The wire is pulled out straight from the wire surrounding portion.

The device connector described above may be used in an environment where the wire may be bent at a steep angle and, in that case, the wire may be broken.

SUMMARY

A connector disclosed by this specification includes terminals, wires connected respectively to the terminals, and a housing integrally holding the terminals and the wires. The housing includes a terminal holding portion collectively holding the terminals and wire holding portions individually holding the wires. The wire holding portions are flexible, project in the same direction from the terminal holding portion and are separated from each other. According to this configuration, each wire holding portion is deflected easily when the wire is bent at a steep angle. Thus, the wire is bent gently and the breakage of the wire can be avoided as compared to the case where the wire holding portions are configured integrally.

The housing may include a fitting portion that can fit into a mounting hole provided in a case, and the wire holding portions may project in a direction perpendicular to a fitting direction from the terminal holding portion into the mounting hole. According to this configuration, the fitting portion is less likely to be detached from the mounting hole of the case and stress applied to each wire holding portion increases when the wires are bent. However, the wires can be bent gently by the deflection of each wire holding portion.

The wire holding portion may be composed of a large diameter portion connected to the terminal holding portion and a small diameter portion connected to the large diameter portion. According to this configuration, the wire holding portion is deflected more easily as extending from the large diameter portion to the small diameter portion. Thus, the wire holding portion is deflected gently and is less likely to be broken as compared to the case where the wire holding portion is composed only of the large diameter portion.

According to the connector disclosed by this specification, it is possible to avoid the breakage of the wires.

DETAILED DESCRIPTION

Figure 1:
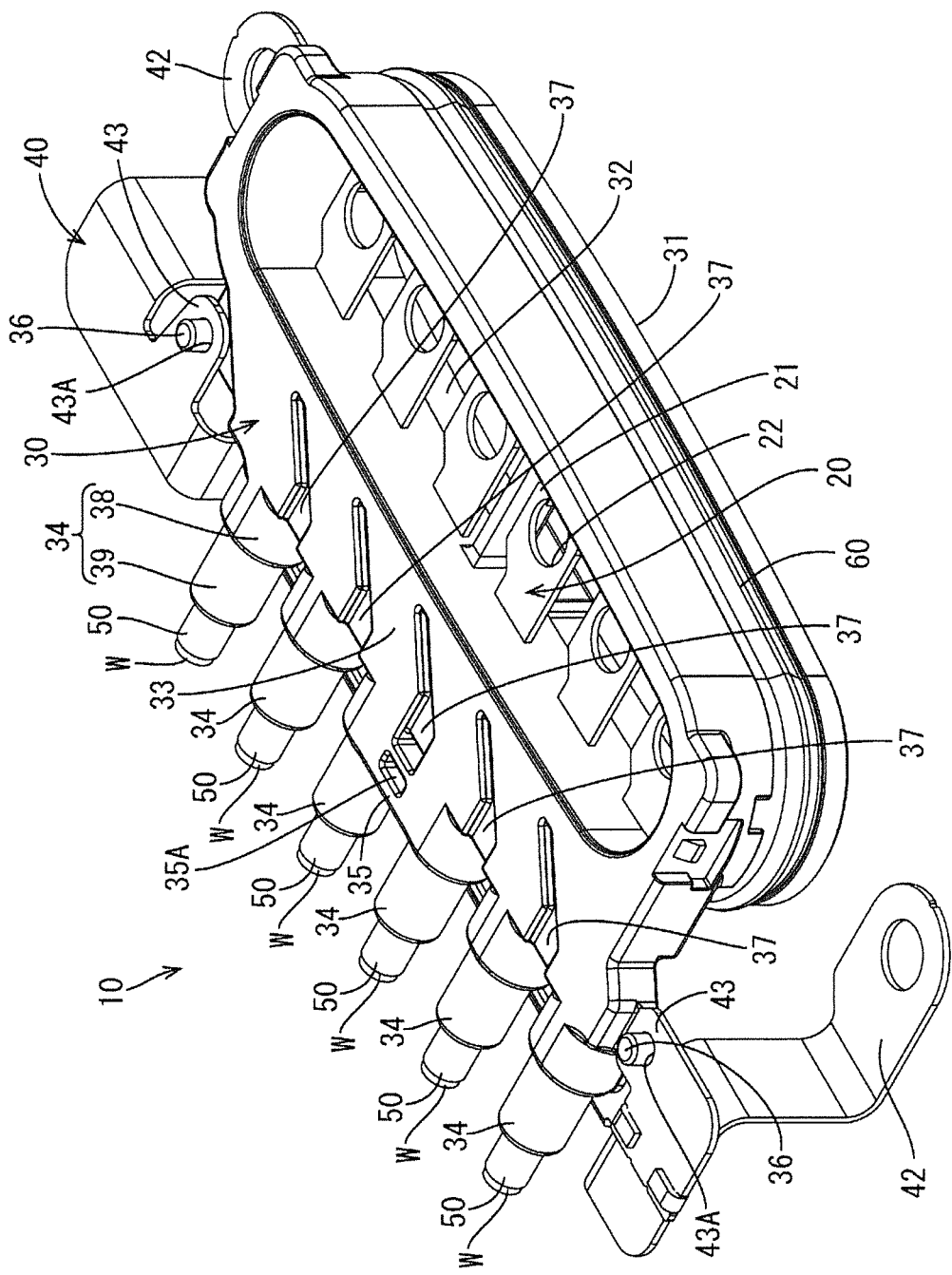
FIG. 1 is a perspective view of a connector.

An embodiment is described with reference to FIGS. 1 to 8. A connector 10 of this embodiment is a device connector to be mounted on a device such as a motor or an inverter. As shown in FIG. 1, the connector 10 includes terminals 20, wires W connected to the terminals 20, a housing 30 integrally holding the terminals 20 and the wires W, and a bracket 40 for mounting the housing 30 on a case 1 of the device.

Figure 2:
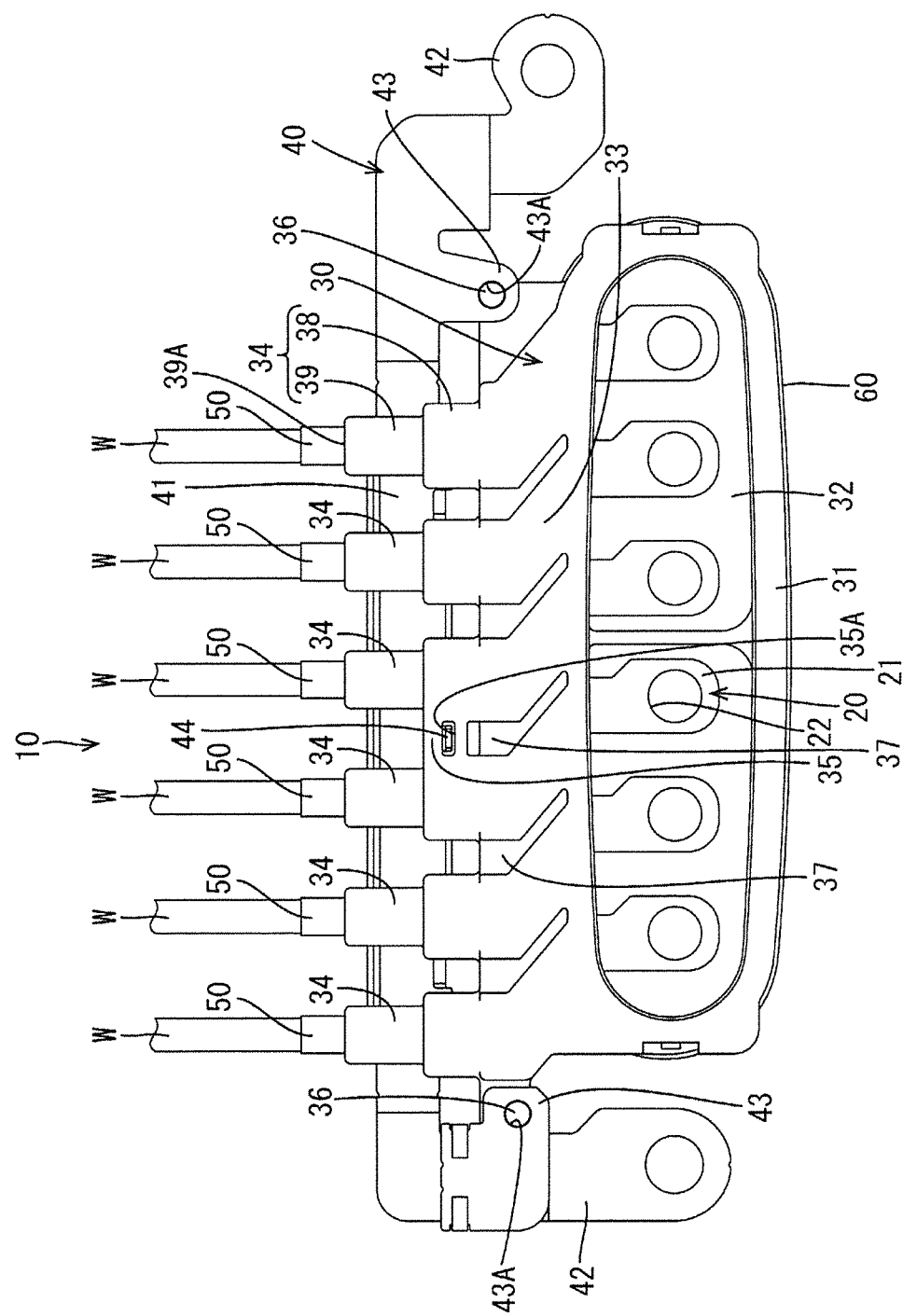
FIG. 2 is a plan view of the connector.

The terminal 20 is a flat plate-like busbar terminal made of conductive metal and includes, as shown in FIG. 2, a bolt hole 21 through which an unillustrated bolt is inserted. A part where the bolt hole 21 is provided serves as a device-side connecting portion 22 to be connected to the bolt. Although not shown, a wire-side connecting portion connected to the wire W is embedded in the housing 30.

Figure 7:
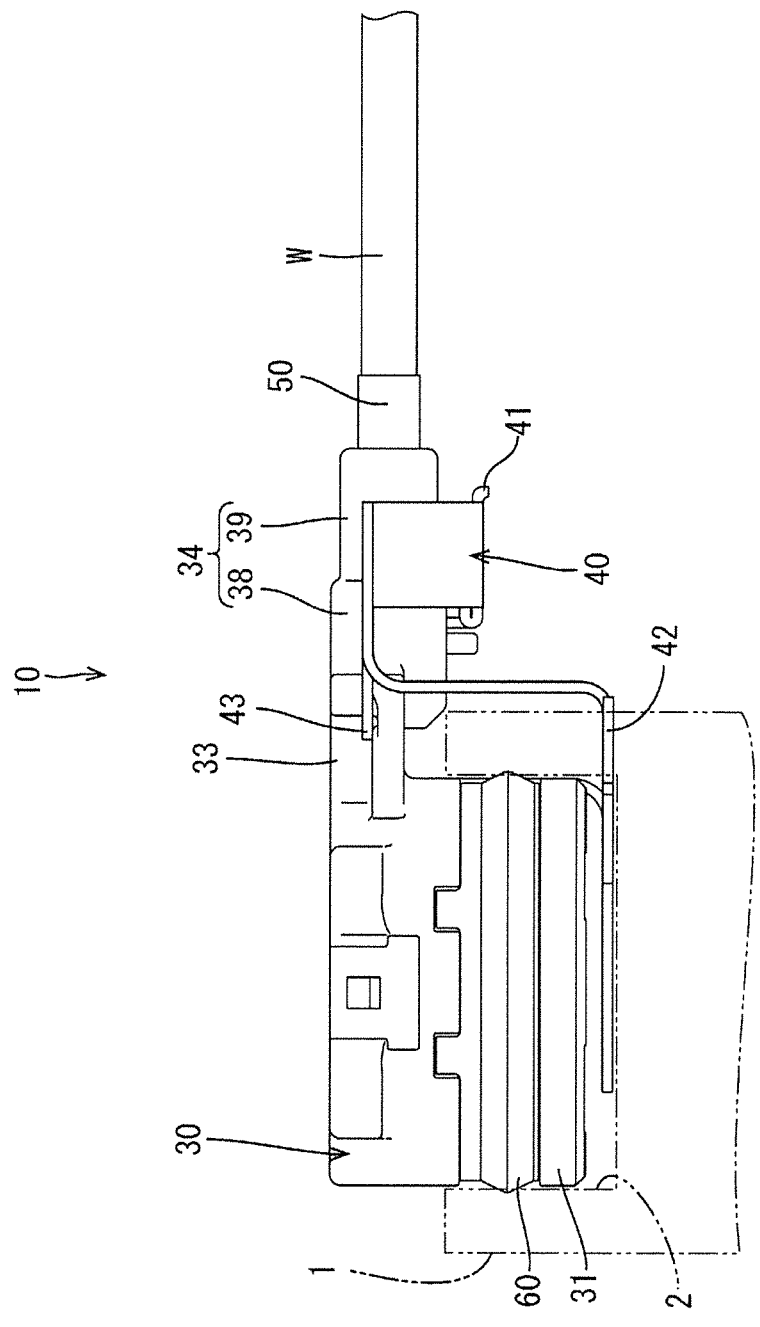
FIG. 7 is a right side view of the connector.

The housing 30 is made of synthetic resin and includes, as shown in FIG. 7, a fitting 31 that can fit into a mounting hole 2 in the case 1 of the device. The fitting 31 has a tubular shape, and an opening 32 having a laterally long elliptical shape penetrates through the fitting 31 in a vertical direction. The device-side connecting portions 22 of the terminals 20 are disposed side by side in a long side direction of the opening 32 while projecting in a short side direction of the opening 32 from an inner wall of the opening 32. Further, an annular rubber ring 60 is mounted on the outer peripheral surface of the fitting 31. With the fitting 31 fit in the mounting hole 2 of the case 1, the rubber ring 60 is sandwiched between the inner peripheral surface of the mounting hole 2 and the outer peripheral surface of the fitting 31, thereby blocking the entrance of water into the inside of the case 1.

A terminal holding portion 33 is provided behind the fitting 31 and collectively holds the terminals 20, and wire holding portions 34 are provided behind the terminal holding portion 33 for individually holding the wires W. The wire holding portions 34 are flexible, project rearward from the rear end of the terminal holding portion 33 and are separated from each other. However, only two of the wire holding portions 34 located in a center are coupled by a coupling portion 35. A hole 35A penetrates through the coupling portion 35 in the vertical direction.

Figure 5:
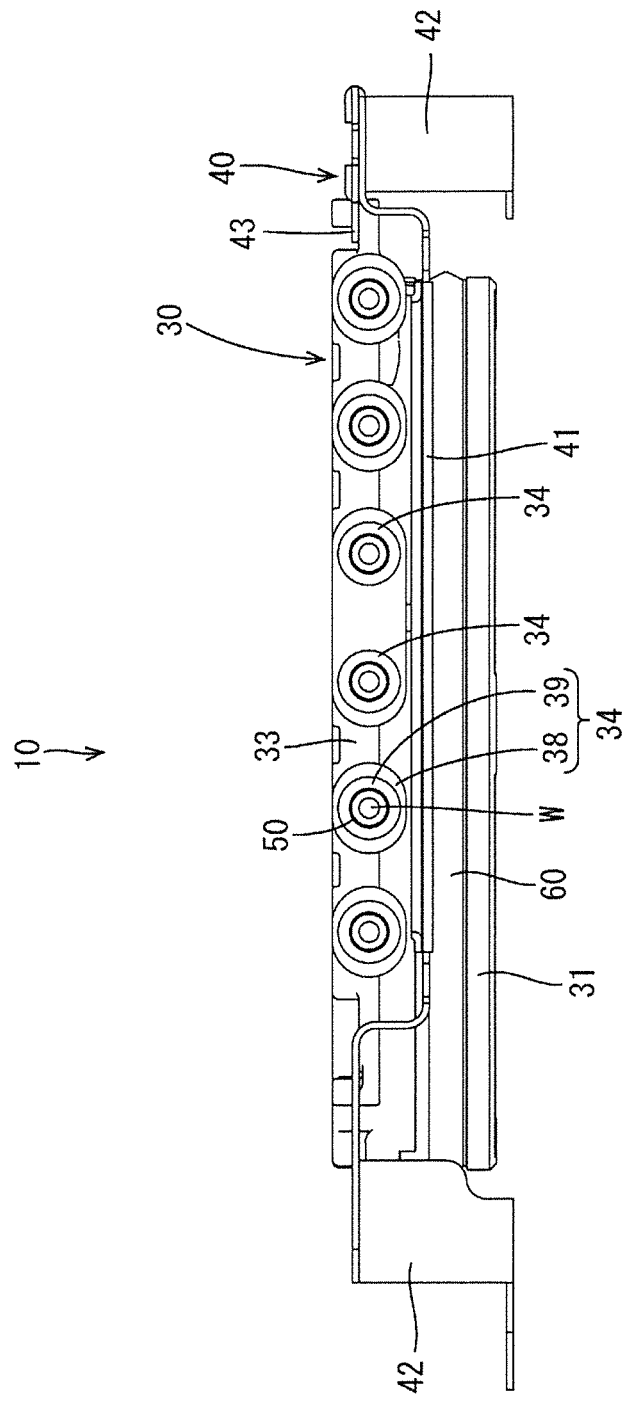
FIG. 5 is a back view of the connector.
Figure 6:
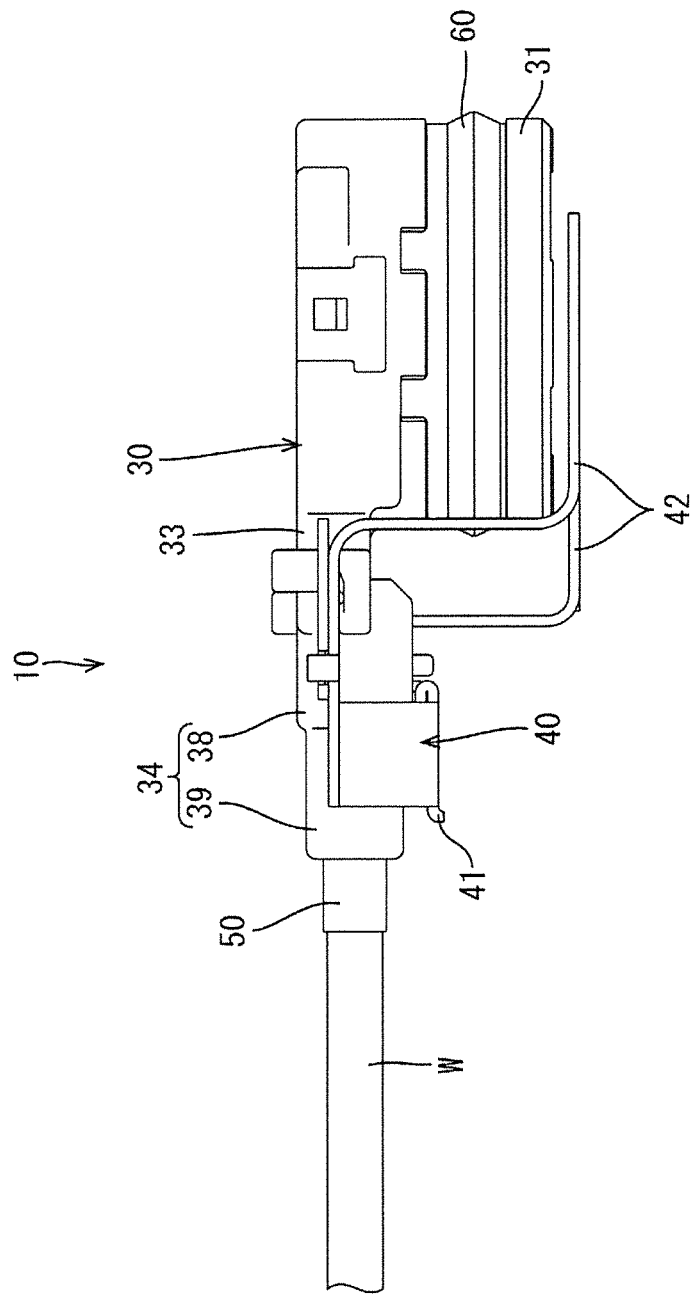
FIG. 6 is a left side view of the connector.

The bracket 40 is a flat plate made of conductive metal and includes a shield connecting portion 41 to be connected to a fabric-like shield member and two mounting portions 42 provided on both sides of the shield connecting portion 41. The shield connecting portion 41 is curved to collectively surround the wire holding portions 34 from below as shown in FIG. 5, and the mounting portions 42 are disposed at both left and right sides of the housing 30, as shown in FIG. 2. The respective mounting portions 42 are provided with two upper mounting pieces 43 protruding toward the housing 30. The respective upper mounting pieces 43 are provided with two holes 43A penetrating in the vertical direction.

Figure 3:
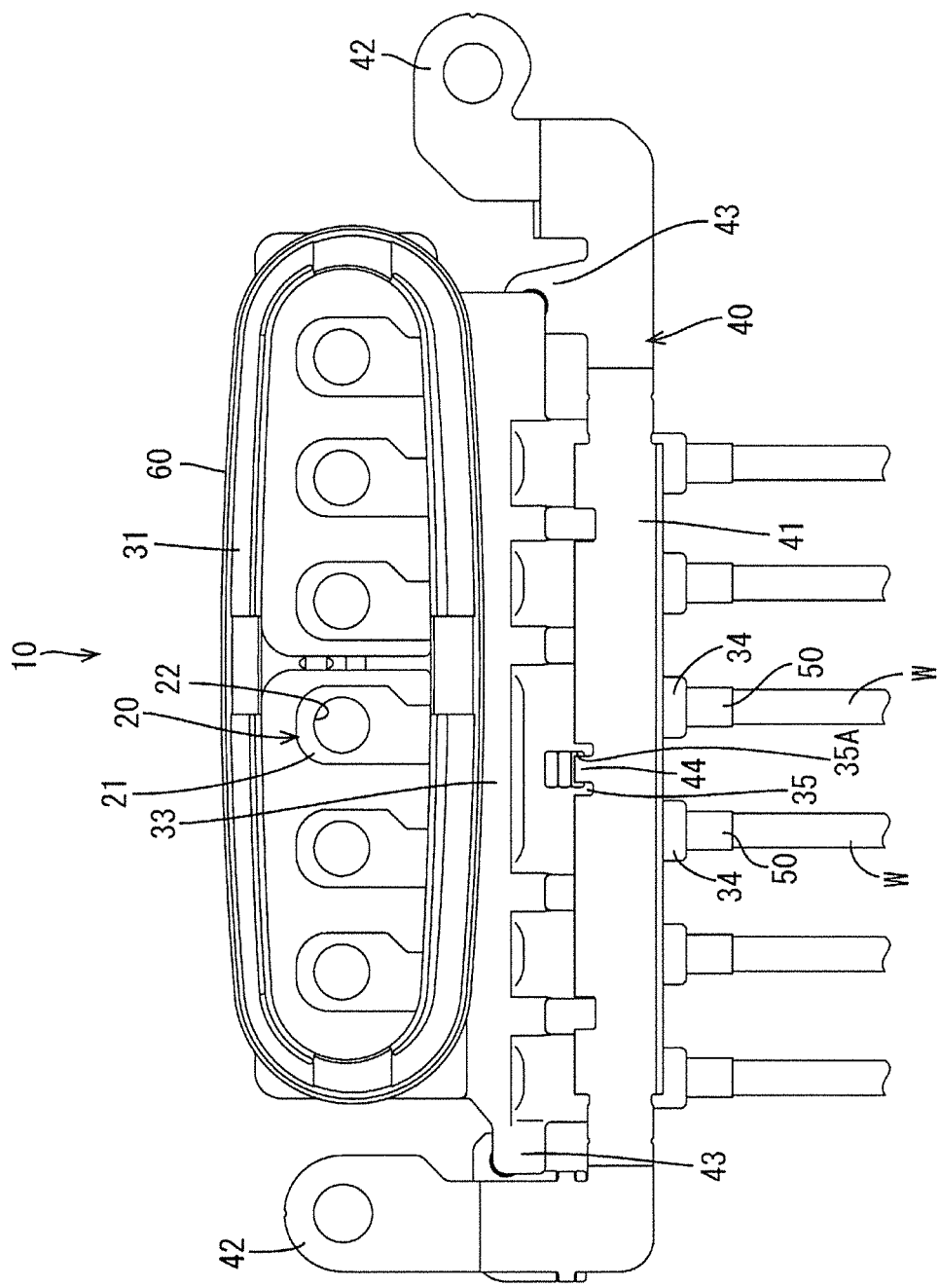
FIG. 3 is a bottom view of the connector.
Figure 4:
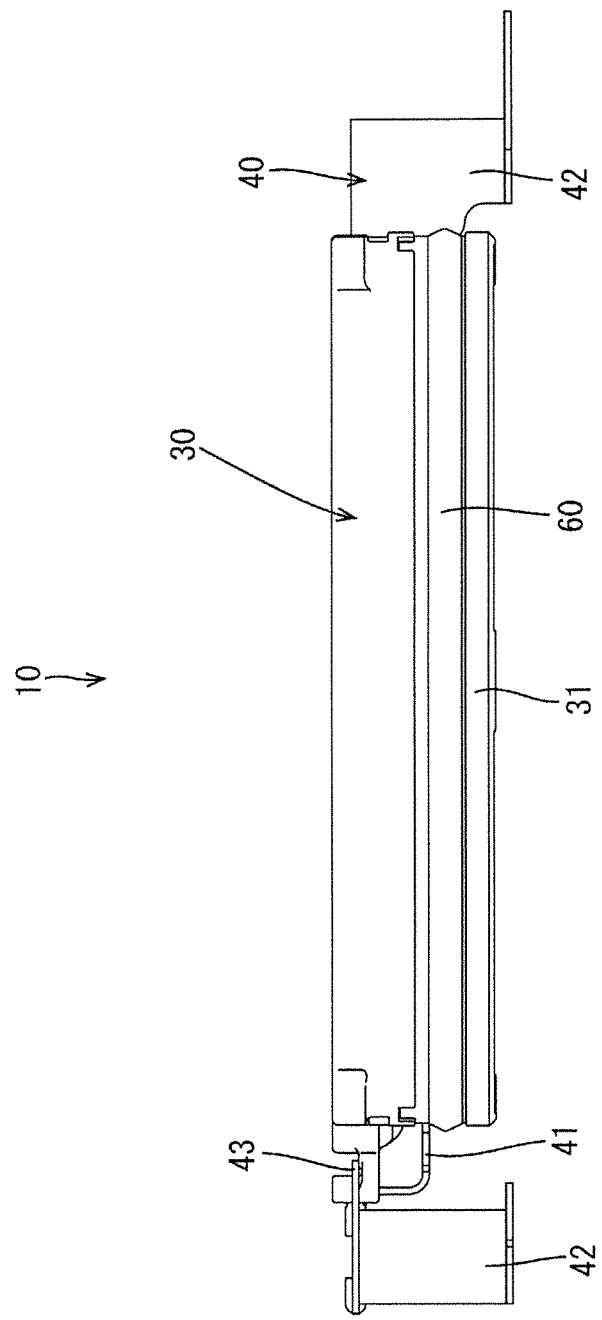
FIG. 4 is a front view of the connector.

On the other hand, projections 36 are provided on both sides of the terminal holding portion 33 in the housing 30. The projections 36 are inserted respectively through the holes 43A in the bracket 40. As shown in FIG. 3, a lower mounting piece 44 is provided on the front edge of the shield connecting portion 41. The lower mounting piece 44 is inserted into the hole 35A in the housing 30 from below. In this way, the bracket 40 is mounted on the housing 30.

Specifically as shown in FIG. 2, the wire holding portion 34 includes a large diameter portion 38 connected to the rear end of the terminal holding portion 33 and a small diameter portion 39 connected to the rear end of the large diameter portion 38. The rear end of the large diameter portion 38 is located behind the front edge of the shield connecting portion 41, and the rear end of the small diameter portion 39 is located behind the rear edge of the shield connecting portion 41. On the other hand, grooves 37 are provided in the upper surface of the terminal holding portion 33. A separation distance between adjacent large diameter portions 38 substantially matches a width of the groove 37. A space formed between the adjacent large diameter portions 38 extends rearward while communicating with the groove 37.

Figure 8:
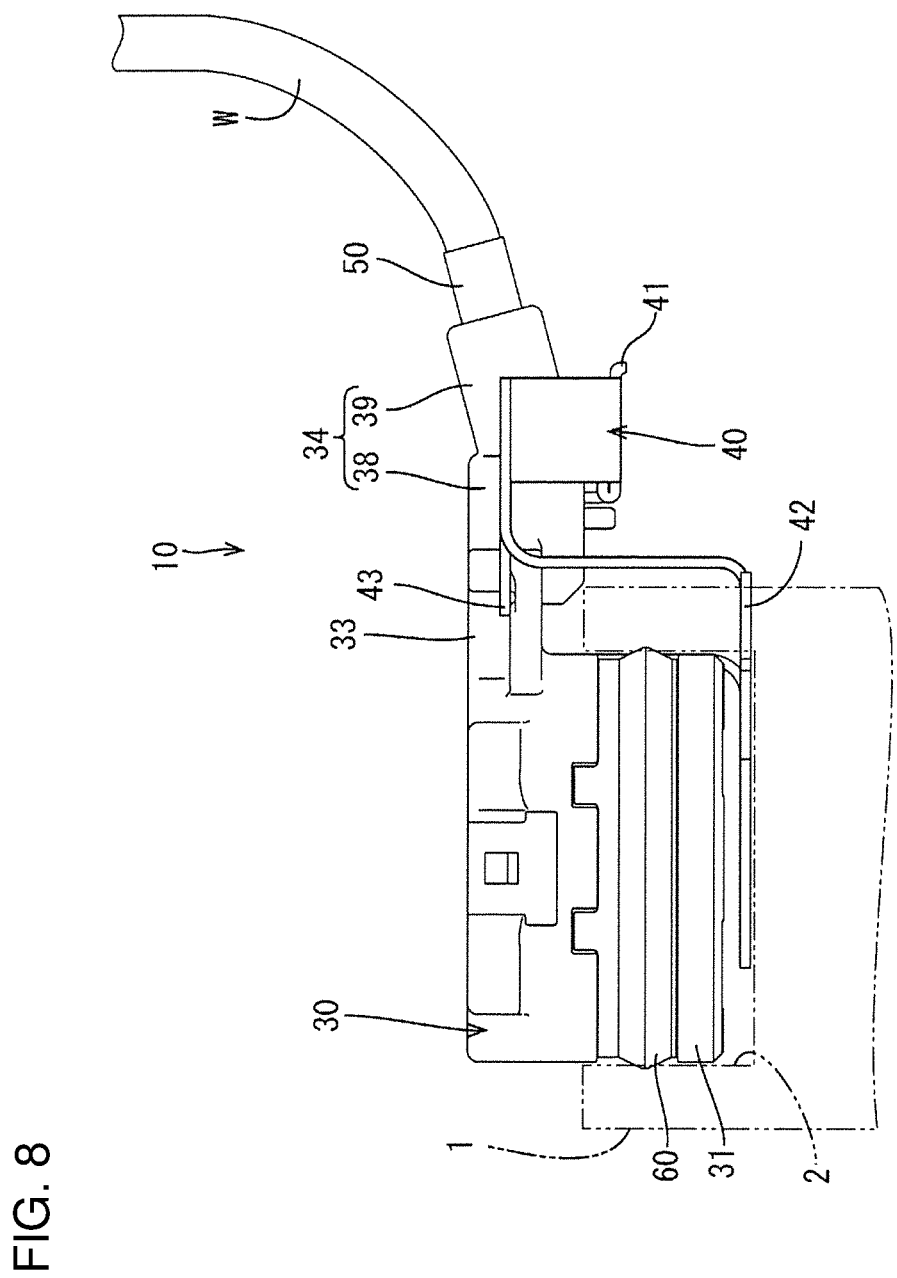
FIG. 8 is a view showing a state where a wire is bent at a steep angle.

After the fitting 31 of the connector 10 is fit into the mounting hole 2 and the mounting portions 42 are fixed to the case 1, as shown in FIG. 7, the wires W are bent substantially at a right angle, as shown in FIG. 8. As the wires W are bent, the wire holding portions 34 are deflected slightly up. This can prevent the breakage of the wires W by gently bending the wires W. Note that the shield connecting portion 41 is provided only below the wire holding portions 34 and the wire holding portions 34 are open upward. Thus, the deflection of the wire holding portions 34 is not impeded by the shield connecting portion 41.

As described above, the connector 10 disclosed by this specification includes the terminals 20, the wires W connected respectively to the terminals 20 and the housing 30 integrally holding the terminals 20 and the wires W. The housing 30 includes the terminal holding portion 33 collectively holding the terminals 20 and the wire holding portions 34 individually holding the wires W. The wire holding portions 34 are flexible, project in the same direction from the terminal holding portion 33 and are separated from each other. According to this configuration, each wire holding portion 34 is deflected easily when the wire W is bent at a steep angle. Thus, the wire W is bent gently and the breakage of the wire W can be avoided as compared to the case where the wire holding portions 34 are configured integrally.

Further, the housing 30 may include the fitting 31 that can fit into the mounting hole 2 provided in the case 1, and the wire holding portions 34 may project in a direction perpendicular to a fitting direction into the mounting hole 2 from the terminal holding portion 33. According to this configuration, the fitting 31 is less likely to be detached from the mounting hole 2 of the case 1 and stress applied to each wire holding portion 34 increases when the wires W are bent. However, the wires W can be bent gently bent by the deflection of each wire holding portion 34.

The wire holding portion 34 may be composed of the large diameter portion 38 connected to the terminal holding portion 33 and the small diameter portion 39 connected to the large diameter portion 38. According to this configuration, the wire holding portion 34 is deflected more easily as extending from the large diameter portion 38 to the small diameter portion 39. Thus, the wire holding portion 34 is deflected gently and is less likely to be broken as compared to the case where the wire holding portion 34 is composed only of the large diameter portion 38.

The invention is not limited to the above described and illustrated embodiment. For example, the following modes are also included.

Although the fitting direction of the fitting 31 into the mounting hole 2 and a projecting direction of the wire holding portions 34 from the wire holding portion 33 are directions perpendicular to each other in the above embodiment, the fitting direction and the projecting direction may be the same direction.

Although the wire holding portion 34 is composed of the large diameter portion 38 and the small diameter portion 39 in the above embodiment, the wire holding portion may be configured to have a constant diameter.

LIST OF REFERENCE SIGNS

10 . . . connector
20 . . . terminal
30 . . . housing
31 . . . fitting
33 . . . terminal holding portion
34 . . . wire holding portion
38 . . . large diameter portion
39 . . . small diameter portion
W . . . wire

The invention claimed is:

1. A connector, comprising:
   terminals, each of the terminals having a device-side connecting portion, and the device-side connecting portions being disposed substantially side-by-side;
   wires respectively connected to the terminals;
   a bracket including a shield connecting portion to be connected to a fabric-like shield member; and
   a housing formed integrally from a synthetic resin and including a single terminal holding portion collectively holding all of the terminals so that the device side connecting portions project from the single terminal holding portion, a single tubular fitting extending integrally from the single terminal holding portion so that the device side connecting portions are within the single tubular fitting, the singular tubular fitting being configured to fit in a fitting direction into a mounting hole provided in a case, and wire holding portions projecting from a common side of the single terminal holding portion in a direction perpendicular to the fitting direction, each of the wire holding portions individually holding one of the wires, the wire holding portions being flexible and being separated from each other;
   each of the wire holding portions being composed of a large diameter portion connected to the single terminal holding portion and a small diameter portion connected to the respective large diameter portion; and
   a rear end of the small diameter portion being located behind a rear edge of the shield connecting portion.

2. The connector of claim 1, further comprising a single annular rubber ring mounted around an outer peripheral surface of the fitting.

3. A connector, comprising:
   terminals;
   wires respectively connected to the terminals;
   a housing formed integrally from a synthetic resin and including a tubular fitting with opposite first and second ends, the first end of the tubular fitting being configured to be fit to a case of a device and the second end of the tubular fitting being open and defining a single terminal holding portion collectively holding all of the terminals, and wire holding portions projecting from a common side of the single terminal holding portion, each of the wire holding portions individually holding one of the wires, the wire holding portions being flexible and being separated from each other, each of the wire holding portions being composed of a large diameter portion connected to the single terminal holding portion and a small diameter portion connected to the respective large diameter portion; and a bracket including mounting portions configured to mount to the case and a shield connecting portion connected to the mounting portions and extending along a side of each of the wire holding portions facing away from the open second end of the tubular fitting, the shield connecting portion being connectable to a fabric-like shield member, wherein the small diameter portion of each of the wire holding portions is bendable away from the shield connecting member.

4. The connector of claim 3, wherein the first end of the tubular fitting is configured to fit into a mounting hole provided in the case, and the wire holding portions project in a direction perpendicular to a fitting direction from the terminal holding portion into the mounting hole.

5. The connector of claim 3, wherein an end of the small diameter portion of each of the wire holding portions is located farther from the terminal holding portion than the terminal holding portion.

6. The connector of claim 5, wherein an end of the large diameter portion of each of the wire holding portions is aligned with the shield connecting portion.

7. A connector, comprising:
terminals;
wires respectively connected to the terminals;
a housing integrally holding the terminals and the wires; and
a bracket connected to the housing and including a shield connecting portion to be connected to a fabric-like shield member, the shield connecting portion having a rear edge facing away from the housing;
the housing being a one-piece member made of synthetic resin and including a terminal holding portion collectively holding the terminals and wire holding portions individually holding the wires, the wire holding portions being flexible, projecting in a common direction from the terminal holding portion and being separated from each other;
each of the wire holding portions being composed of a large diameter portion connected to the terminal holding portion and a small diameter portion connected to the large diameter portion; and
the small diameter portion of each of the wire holding portions having a front end integral with the large diameter portion and a rear end opposite the front end, the rear end of the small diameter portion projecting rearwardly beyond the shield connecting portion.

8. The connector of claim 7, wherein the shield connecting portion is disposed to face one side of the wire holding portions so that the flexible wire holding portions are bendable away from the shield connecting portion.

* * * * *